Nov. 4, 1952     H. R. NOLL     2,616,160
WORK FEED
Filed April 19, 1946     2 SHEETS—SHEET 1
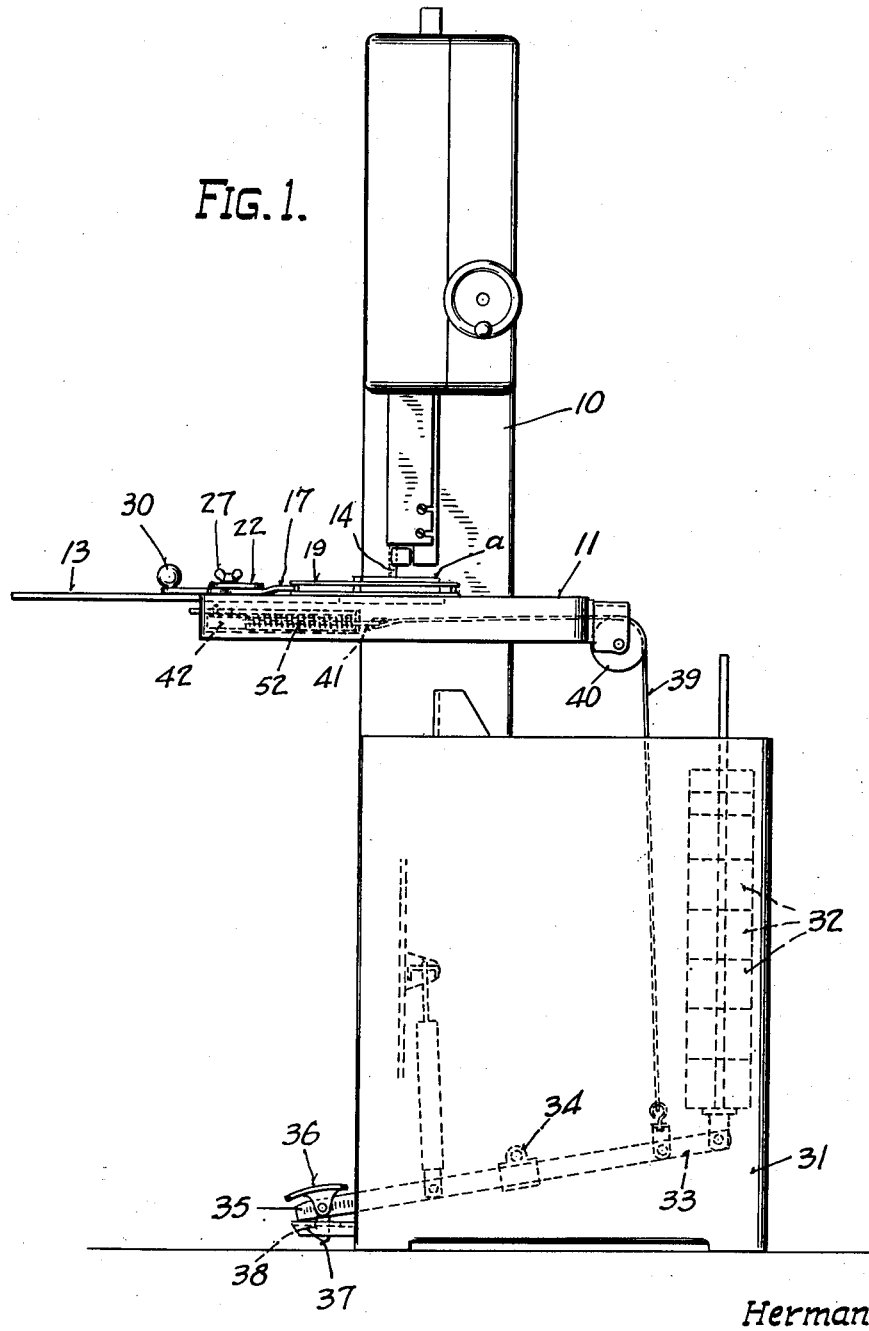
Herman R. Noll
INVENTOR.
BY
ATTORNEY.

Nov. 4, 1952
H. R. NOLL
2,616,160
WORK FEED
Filed April 19, 1946
2 SHEETS—SHEET 2
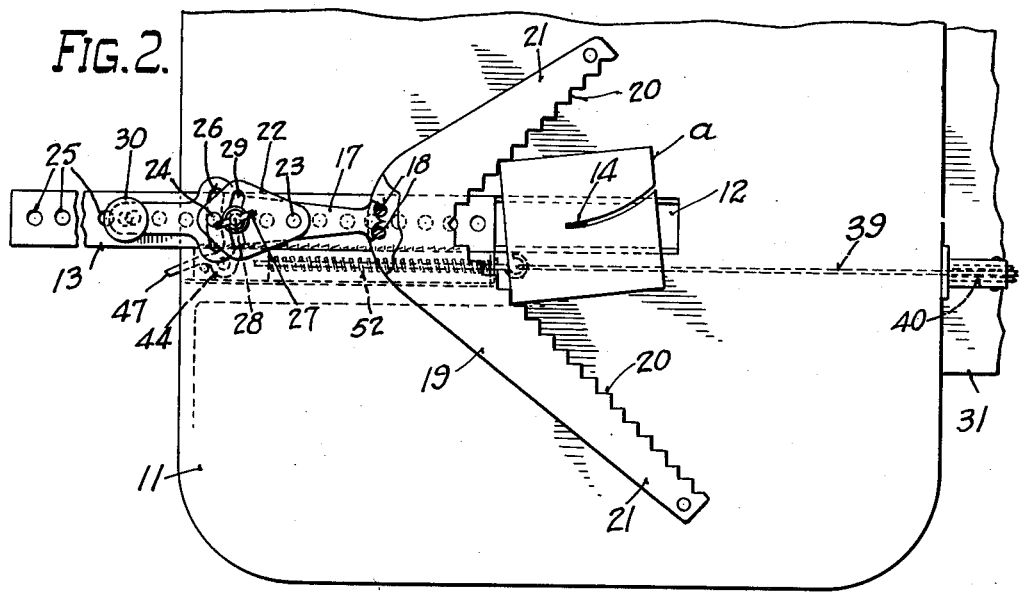
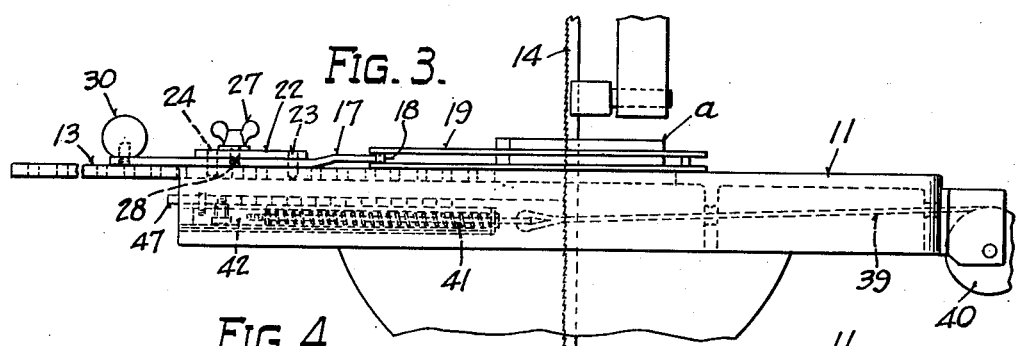
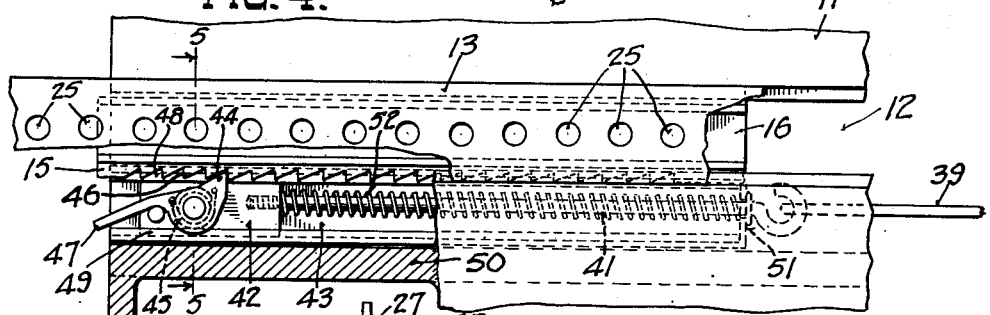
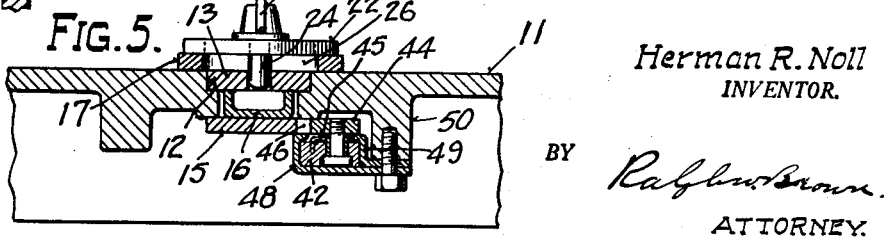
Herman R. Noll
INVENTOR.
BY Ralph Brown
ATTORNEY.

Patented Nov. 4, 1952

2,616,160

UNITED STATES PATENT OFFICE 2,616,160

WORK FEED

Herman R. Noll, Grafton, Wis., assignor to Grob Brothers, Grafton, Wis., a copartnership Application April 19, 1946, Serial No. 663,577

1 Claim. (Cl. 29—68)

This invention relates to work feeding mechanisms for power band saws and the like.

One object of the present invention is to improve the construction and operation of the work feeding mechanism disclosed in the prior patent to Grob et al. No. 2,364,969.

The feed mechanism disclosed in said patent is actuated by a weight and the advance of the work piece is normally limited by the length of stroke of the weight, a special time-consuming adjustment of parts being required to effect advance of the work piece beyond that limit.

A more specific object of the present invention is to provide an improved work feeding mechanism of that character in which advance of the work piece may be automatically extended by a simple manipulation of the feed actuator.

Other more specific objects and advantages will appear, expressed or implied, from the following description of a work feed constructed in accordance with this invention.

In the accompanying drawings:

Figure 1 is a view in side elevation of a band saw equipped with a work feed embodying the present invention.

Fig. 2 is a plan view on a larger scale of the saw table equipped with the work feed of Fig. 1.

Fig. 3 is a view in side elevation of the saw table and work feed.

Fig. 4 is a fragmentary plan view on a still larger scale of the table and work feed with parts of the table broken away to better illustrate parts of the work feed shown.

Fig. 5 is a transverse sectional view taken along the line 5—5 of Fig. 4.

The work feed mechanism selected for illustration is shown applied to a metal cutting band saw machine 10 of any standard or approved type having a conventional work supporting table 11. In this instance the table 11 is equipped with a guide slot 12 adapted to slidably receive and support a feed bar 13 whose top surface is preferably substantially flush with the work supporting surface of the table.

The feed bar 13 is disposed in front of the saw blade 14 and extends in the direction of the cutting action thereof. The feed bar is lengthwise withdrawable from the slot 12 but positioned therein by a retainer bar 15 permanently fixed to the under side of the feed bar 13 preferably through an intermediate spacer bar 16 welded or otherwise attached to both bars 13 and 15.

The feed bar 13 is shown equipped with a work thrust member preferably in the form of a lever 17 whose forward end is fashioned for intermeshing engagement with a pair of closely spaced pins 18 provided in a suitable work holder 19. The work holder shown comprises an angular frame adapted to rest on the table 11 and equipped with deeply serrated edges 20 adapted to interlock with and thereby securely grip a work piece $a$ in any of various positions between the angular arms 21 thereof.

The thrust lever 17 is detachably mounted on the feed bar 13 at any of the multiplicity of positions lengthwise thereof. For this purpose an anchor plate 22 is provided, with a pair of anchor pins 23 and 24 depending from the opposite ends thereof and engageable in any of the longitudinal series of holes 25 provided in the bar 13. The anchor plate 22 overlies the lever 17 and one of the anchor pins 23 extends through the lever 17 and provides a fulcrum therefor. The other anchor pin 24 extends through a transverse slot 26 in the lever 17, so as to permit angular adjustment of the lever about the fulcrum 23. A wing nut 27 on a stud 28, that projects from the lever 17 through a slot 29 in the anchor plate 22, provides a convenient means for releasably securing the lever 17 in any position of angular adjustment.

From the foregoing it will be noted that the thrust lever 17 and anchor plate 22 are removable as a unit from the feed bar 13, and that both may be mounted on the feed bar 13 at any of a multiplicity of positions along the bar to accommodate work pieces of various sizes.

It will of course be understood that by angular adjustment of the thrust lever 17 about the fulcrum 23, the work holder 19 and work piece $a$ may be adjusted about the cutting edge of the saw blade 14 to thus regulate and control the direction of cut through the work piece. To facilitate this adjustment the lever 17 is equipped with a suitable handle 30.

The work piece $a$ is advanced toward the saw by a longitudinal advance of the feed bar 13 transmitted to the work piece through the thrust lever 17 and work holder 19. Advance of the feed bar 13 is effected automatically preferably by actuating means such as will now be described. The means shown for this purpose is energized by a stack of suitable weights 32 preferably arranged within the base 31 of the machine and supported by the inner end 33 of a lever which is fulcrumed at 34 within the base 31. The outer end 35 of this lever projects from the base 31 and carries an actuating pedal 36 rockably attached thereto. A detent 37 depending from the pedal 36 is engageable beneath a fixed lug 38 on the base 31 to releasably retain the outer end 35 of the lever in the depressed position shown in Fig. 1. In this position the inner lever end 33 and the weights 32 are of course elevated. This is the position normally assumed by the weights before starting a sawing operation.

A cable 39, connected to the forward end 33 of the weight-carrying lever and trained over a pulley 40 carried by the rear edge of the table 11, provides an operating connection between the weights 32 and a suitable mechanism through which the feed bar 13 is advanced when the detent 37 is released. In this instance the cable 39 is shown connected through a rod 41 with a slide block 42 slidably confined within a guideway 43 that extends parallel to the feed bar 13. The slide block 42 carries a pawl 44 rockably supported thereon and urged by a spring 45 into engagement with ratchet teeth 46 provided on the adjacent edge of the retainer bar 15 fixed to the feed bar 13. The pawl 44 may be manually withdrawn from the teeth 46, when desired, by manipulation of a tail piece 47 on the pawl, the tail piece being accessable for this purpose through the outer open end of the guideway 43 when the block 42 is in the retracted position shown in Fig. 4.

As indicated in Fig. 5, the guideway 43 is formed by two suitably fashioned metal strips 48 and 49 bolted or otherwise attached to a rib 50 formed on the under side of the table 11. As indicated particularly in Fig. 4, the inner end 51 of the guideway 43 is closed, and a coil spring 52, surrounding the rod 41 and reacting against the closed end 51 of the guideway, urges the slide block 42 toward the retracted position shown, and this spring also functions to take up any slack that might otherwise occur in the cable 39.

The arrangement is such that the advance of the work piece $a$ against the saw blade 14 is initiated by tilting the pedal 36 and thereby releasing the detent 37 from the lug 38 so as to render the inner end 33 of the weight-carrying lever free to lower under the load of the weights 32. The weights 32 thereupon become active to tension the cable 39, and this force, transmitted through the block 42 and pawl 44 to the feed bar 13, urges the latter forwardly so as to maintain the required pressure between the work piece $a$ and the saw blade 14.

The work piece $a$ thus continues to advance against the saw blade until the weights 32 reach the limit of their downward movement, unless the desired saw cut has been completed before that limit is reached. In the event that the desired saw cut is not completed during a single down stroke of the weights 32, the feeding action may be continued beyond that limit by merely depressing the pedal 36, so as to elevate the weights 32 to their upper position, and thereafter releasing the pedal to permit the weights to again tension the cable 39. It will of course be understood that during the return of the weights to their upper position, the slide block 42 automatically returns to the retracted position shown under the thrust of the spring 52, causing the pawl 44 to automatically release and reengage the ratchet teeth 46 at a fresh point along the feed bar 13 further from the work piece than the initial point of engagement. Thereafter the weights 32, acting through the cable 39, effect a renewed advance of the feed bar 13 and work piece $a$ toward the saw blade in the manner above described.

Various changes may be made in the embodiment of the invention hereinabove specifically described without departing from or sacrificing the advantages of the invention as defined in the appended claim.

I claim:

In a machine of the character described the combination of a work support, an operating tool extending therethrough, a bar carried by said support and lengthwise movable toward and from said tool, a work engaging member actuated by said bar to advance a work piece toward said tool, an actuating member heaving a limited working stroke, coacting pawl and ratchet elements, one of said elements being connected to said bar for movement therewith, a cable connecting the other of said elements to said actuating member to provide a force transmitting connection between said actuating member and bar through which the work piece is pressed against said tool by said actuating member during a working stroke thereof, means for reracting said actuating member, and means operable on said other of said elements to maintain said cable taut and to effect a ratcheting action between said pawl and ratchet elements during retraction of said actuating member, whereby said actuating member is rendered effective to further advance the work piece against the tool during the next succeeding working stroke of said actuating member.

HERMAN R. NOLL.

REFERENCES CITED

The following references are of record in the file of this patent:

UNITED STATES PATENTS

| Number | Name | Date |
|---|---|---|
| Re. 14,542 | Embree | Oct. 29, 1918 |
| 1,467,525 | Banker | Sept. 11, 1923 |
| 1,806,130 | Stull | May 9, 1931 |
| 2,296,967 | Wilkie | Sept. 29, 1942 |
| 2,364,969 | Grob et al. | Dec. 12, 1944 |